Nov. 1, 1960     F. F. SNELL     2,958,759
GEAR AND SHAFT ASSEMBLY
Filed Oct. 4, 1957
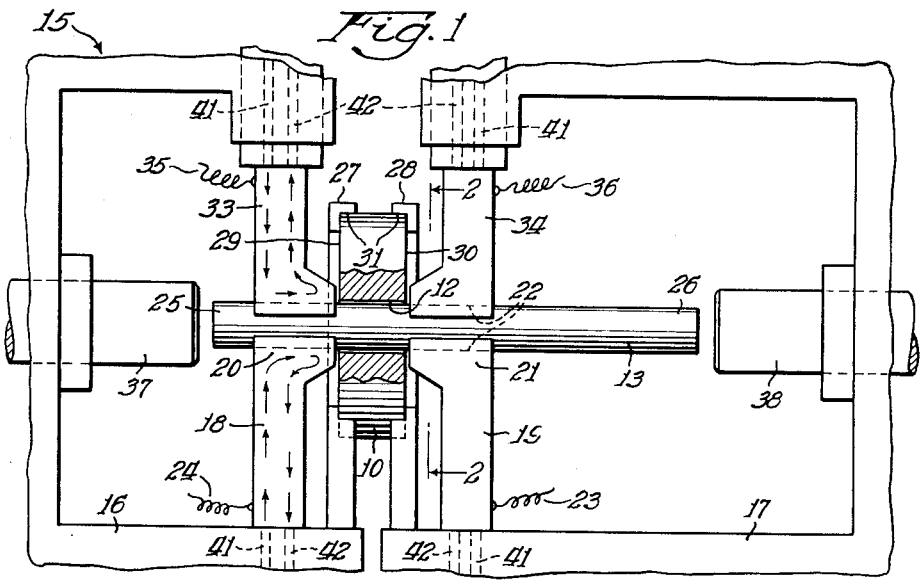
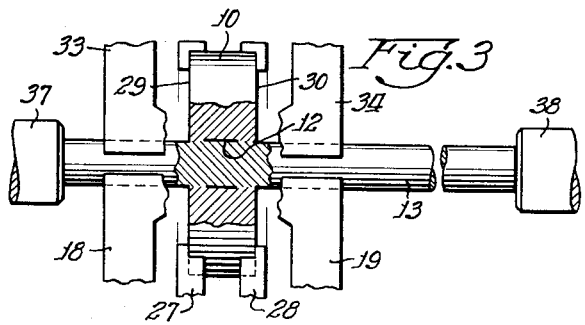
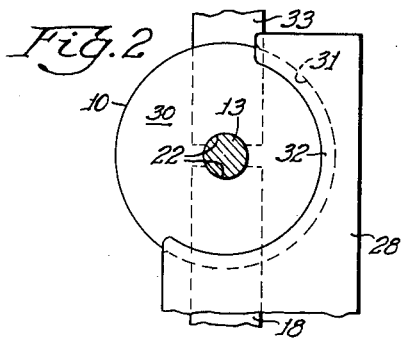
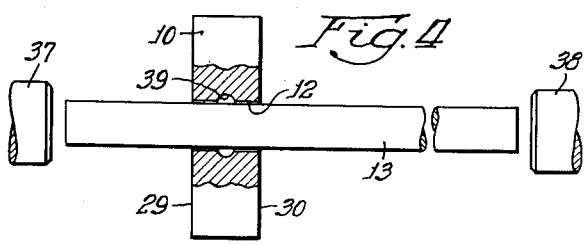
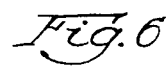
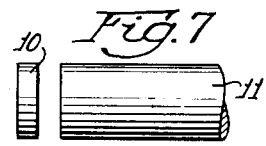
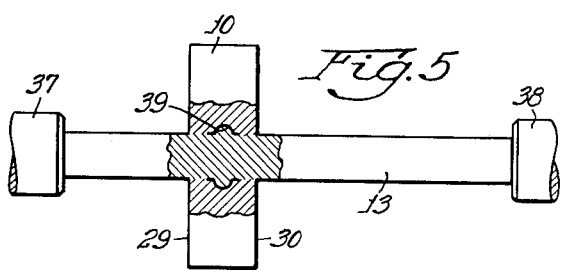
Inventor:
Ford F. Snell
By: Frank C. Parker Atty.

United States Patent Office 2,958,759
Patented Nov. 1, 1960

2,958,759

GEAR AND SHAFT ASSEMBLY

Ford F. Snell, Big Prairie, Ohio, assignor to Borg-Warner Corporation, Chicago, Ill., a corporation of Illinois Filed Oct. 4, 1957, Ser. No. 688,284

16 Claims. (Cl. 219—152)

This invention relates to an improved gear and shaft assembly and to the method of fabricating a gear and shaft blank assembly in which the gear and shaft blanks are integrally interconnected.

Heretofore, when fabricating gear and shaft assemblies for use in high pressure gear pumps generally of the type disclosed in the patent to Roth et al., 2,420,622, which require gear and shaft structures in which there is no relative movement between the gear and shaft, it was necessary to machine from metal bar stock the complete gear and shaft structure, starting the machine operation with the bar stock having a diameter at least as large as the diameter of the desired gear size. As the axial length of the gear with respect to the axial length of the shaft is relatively small, much of the bar stock was cut away, resulting in a great amount of scrap metal. In view of the uneconomical waste of metal produced by the unitary gear and shaft assembly constructed from solid bar stock of the previously described method of fabrication and the high cost of labor involved in the machine operation therefor, many attempts have been made to separately form the gear and shaft and then unite the gear to the shaft. Such methods of uniting the gear to the shaft were accomplished through keying or interference fitting configurations. These methods proved satisfactory experimentally, but were costly and functionally not dependable in production. Other attempts were made to forge the gear and shaft assemblies, but resulted in additional stock removal difficulties and did not result in any appreciable cost reduction. Therefore, until my present invention, it was necessary to use the costly solid gear and shaft construction for use in high pressure gear pumps. It is therefore an object of this invention to provide a method of fabricating a gear and shaft assembly at relatively low cost.

It is another object of this invention to provide a method of fabricating a gear and shaft assembly with a minimum of waste in scrap metal.

It is another object of this invention to provide a method of fabricating a gear and shaft assembly in which a gear blank is united to a shaft blank, the resulting assembly having the qualities of a solid gear and shaft construction.

A further object of this invention is to provide a method of fabricating a gear and shaft assembly in which gear blanks are cut from an appropriately sized round metal bar stock and telescopically mounted on shaft blanks cut from appropriately sized round metal bar stock and united thereto to form a gear and shaft assembly, which after suitable machining, is suitable for use in high pressure gear pumps.

It is still another object of this invention to provide a method of fabricating a gear and shaft assembly suitable for use in high pressure gear pumps comprising the steps of cutting a gear blank and a shaft blank from appropriately sized bar stock, forming a bore in the gear blank, inserting the shaft blank in the bore of the gear blank so that the shaft blank projects beyond the opposite sides of the gear blank, placing electrical conductors around the shaft blank, in both physical and electrical contact therewith, adjacent to the opposite sides of the gear blank but spaced therefrom, passing an electrical current through the electrical conductors to heat the shaft blank by resistance heating until the shaft blank becomes relatively plastic in the regions adjacent to and concentric with the opposite sides of the gear blank, and compressing axially the shaft blank to cause the relatively plastic regions to expand radially and fuse with the gear blank to form a gear and shaft assembly having the qualities of a unitary structure. It is another object of my invention to provide an improved gear and shaft blank assembly which after suitable machining operations is suitable for use in high pressure gear-type pumps.

In the heretofore mentioned forging method of forming a gear and shaft blank assembly, not only was a cost reduction being sought but also an assembly in which the quality of the metal was improved by rendering greater density of the metal. In one type of the many types of forging methods, a solid gear blank has separate shaft pieces butt-welded to the opposed sides thereof. During the forging of the shaft pieces to the gear blank, the shaft metal is rendered more dense, which greatly improves its strength. However, additional stock removal operations, resulting from the forging operation, are necessary which are costly and thereby result in a gear and shaft blank assembly which is not appreciably different in cost than the previously described solid construction. In my present invention not only is a cost reduction realized, but also the shaft blank is greatly improved in strength because the axial compression thereof during the fusion of the shaft blank to the gear blank causes the metal to become more dense, similar to the strengthening of the shaft provided by the previously described forging method. It is therefore still another object of my invention to provide a gear and shaft blank assembly at relatively low cost and improved in strength and quality.

Other and more particular objects, advantages and uses of my invention will become apparent from a reading of the following specification taken in connection with the accompanying drawing, forming a part thereof and wherein:

Figure 1 is an axial plan view of an assembled gear blank, shown in cross section, and shaft blank mounted in a uniting apparatus prior to the uniting operation.

Figure 2 is a portion of the end view of the gear blank and shaft blank assembly taken on the plane of line 2—2 of Figure 1 illustrating the gear blank holding means.

Figure 3 is a fragmentary view showing the principal features of Figure 1 after the uniting operation.

Figure 4 is an axial cross section of another embodiment of a gear blank assembled on a shaft blank prior to the uniting operation.

Figure 5 is an axial cross section of the gear blank and shaft blank construction of Figure 4 after the uniting operation.

Figure 6 is a perspective view of the finished gear and shaft assembly after the gear teeth have been machined and suitable for use in high pressure gear-type pumps.

Figure 7 illustrates the method of cutting gear blanks from bar stock.

Figure 8 illustrates the method of cutting shaft blanks from bar stock

Reference is made to the accompanying drawing in which like reference numerals are used throughout to designate like parts and in particular to Figure 1 thereof illustrating the preferred method of fabricating gear and shaft assemblies according to my invention to produce an end product as illustrated in Figure 6 where a gear blank or portion 10 has been united to a shaft blank or portion 13.

In the method of fabricating gear and shaft assemblies according to my invention gear blanks or portions 10 are cut to the desired axial length from appropriately sized round metal bar stock 11 (see Figure 7) by any well known machine operation. Shaft blanks or portions 13 are also cut to the desired axial length from appropriately sized round metal bar stock 14 (see Figure 8) in the same manner as the aforementioned gear blanks. It is to be understood that not only the axial length of the gear and shaft blanks but also the cross sectional diameters thereof may be of such a size to allow for finishing operations of machining, polishing, etc. to be performed after the uniting operation hereinafter described which constitutes my main invention.

The gear blanks 10 are each provided with a central axial bore 12 by any well known boring or drilling operation, the bore passing through opposite sides 29 and 30 of the gear blank 10. The bore 12 in the gear blank 10 has a size governed by the outer peripheral circumference of the shaft blank 13 on which the gear blank 10 is to be telescopically mounted and integrally connected. A slight clearance space is provided between the outer circumference of the shaft blank 13 and the bore 12 of the gear blank 10 of the order of .001 to .002 inch, although this accuracy need not be rigidly maintained so long as the shaft blank 13 may be inserted within the bore 12 of the gear blank 10.

To maintain the gear blank 10 in its position on the shaft blank 13 during the uniting operation of my invention, any suitable holding device may be used. By way of illustration only, I have shown one such means in Figure 1 where a holding apparatus, generally indicated by reference numeral 15, comprises two flat horizontal metal plates 16 and 17 suitably secured to the base (not shown) of the apparatus 15 and adapted to be axially movable relative to each other for purposes of positioning to be later described.

Two hollow metal electrodes 18 and 19, fixedly attached and insulated therefrom, are carried by the respective plates 16 and 17 and have enlarged end portions 20 and 21 respectively providing arcuate bearing and contact surfaces 22 in the free ends thereof, the surfaces 22 having a configuration complimentary to a portion of the outer peripheral surface of the shaft blank 13. The metal electrodes or conductors 18 and 19 are connected to a suitable electrical power source by any well known electric circuit means such as wires 23 and 24, shown schematically, and are adapted to have a cooling medium circulated therethrough by means of inlet 41 and outlet 42 passages connected at one end thereof to the hollow conductors 18 and 19 and to a cooling medium circulating source (not shown) at the other end thereof for the purpose of cooling the bearing surfaces 22 thereof as well as the rest of the structure of the conductors 18 and 19. Such electrical conductor or electrode coolant circulating means are well known in the art and need not be further described.

After the gear blank 10 has been provided with the proper axial bore 12, the gear blank 10 is mounted on the shaft blank 13. The shaft blank 13 with the gear blank 10 disposed therearound is then placed in the bearing surfaces 22 of the electrical conductors 18 and 19, the gear blank 10 being positioned between the conductors 18 and 19. Suitable aligning means may be provided to maintain the desired uniting position of the gear blank 10 relative to the terminal ends 25 and 26 of the shaft blank 13. One such means is illustrated in Figure 1 and more particularly in Figure 2 of the accompanying drawing and comprises two axially adjustable vertically mounted members 27 and 28, respectively connected to the plates 16 and 17 and having arcuate bearing portions 31 formed in the free ends thereof, adapted to complimentarily receive and retain the gear blank 10. The arcuate bearing portions 31 do not extend axially through both sides of the members 27 and 28 but extend only on one side thereof providing shoulders or flange portions 32, the flanges 32 being adapted to retain the gear blank 10 disposed therebetween. As the members 27 and 28 are axially movable, they are maintained in their extended position i.e., the position where the space between members 27 and 28 is greatest, when the shaft blank and gear blank assembly is placed in the bearing or holding surface 22 of the conductors 18 and 19, the space between members 27 and 28 being large enough to permit the gear blank 10 to be disposed therebetween. After the shaft blank and gear blank are so positioned, the members 27 and 28 are axially moved toward each other until the gear blank 10 is rigidly held between the shoulders 32 of the members 27 and 28 and has a portion of the outer peripheral edge thereof engaging the bearing surfaces 31 of the members 27 and 28.

The electrical conductors 18 and 19 are axially adjusted so that the enlarged portions 20 and 21 respectively thereof are positioned adjacent to and slightly spaced from the opposite sides 29 and 30 of the gear blank 10 when the gear blank and shaft blank assembly is positioned within the bearing surfaces 22 of the conductors 18 and 19.

When the gear blank 10 has been fastened by the members 27 and 28, vertically and axially adjustable electrodes or electrical conductors 33 and 34 are lowered vertically by pneumatic means (not shown) to clamp the shaft blank 13 between the mating bearing surfaces 22 of the conductors 33, 18 and 34, 19. The clamping force may be of the order of 25,000 pounds. The conductors 33 and 34 are similar to conductors 18 and 19 and have enlarged portions 20 thereon with bearing or contact surfaces 22 formed therein in the same manner as the conductors 18 and 19, the conductors 33 and 34 being connected to the apparatus 15 in such a manner as to always be disposed vertically through axial adjustment above the conductors 18 and 19 respectively with the bearing surface 22 of conductor 33 adapted to mate with the bearing surface 22 of conductor 18, and the bearing surface 22 of conductor 34 adapted to mate with the bearing surface 22 of conductor 19.

As has been previously described, the electrical conductors 18 and 19 are connected to a suitable electrical power source (not shown) and are adapted to have a cooling medium circulated therethrough. Similar means are provided for the conductors 33 and 34, the electrical power source respectively comprising wires 35 and 36 and the cooling circulating means respectively comprising inlets 41 and outlets 42 passages in a manner common in the art.

It is now seen that the gear blank 10 is held rigidly with respect to any relative axial movement on the shaft blank 13 and that the shaft blank 13 is held rigidly within the mating bearing surfaces 22 of the electrical conductors 18 and 33, and 19 and 34. As previously stated, the particular holding means of the shaft blank and gear blank assembly prior to the uniting operation does not constitute any part of this invention so long as the gear blank 10 is positioned and held in the desired axial alignment with respect to the shaft blank 13.

It should be noted that the electrical conductors 18 and 33 are adjacent to but spaced from the side 29 of the gear blank 10 and similarly electrical conductors 19 and 34 are adjacent to but spaced from the side 30 of the gear blank 10, and further that the conductors 18, 19, 33 and 34 are in good electrical contact with the shaft blank 13 due to the high clamping pressure previously described.

When the gear blank and shaft blank assembly are so mounted, an electrical current is passed to the electrical conductors 18, 19, 33 and 34 from the power source in such a manner that the current passes through the shaft blank 13 in the region thereof between the two pairs 18, 33 and 19, 34 of electrical conductors. Due to the electrical resistance of the shaft blank 13 and the high amperage of the current, intense heating of the shaft blank 13 takes place in the regions thereof adjacent the opposite sides 29 and 30 of the gear blank 10. This method of electrical heating per se is well known in the art as "resistance heating" and the theory thereof need not be presented herein except to say that by the resistance heating of the shaft blank 13 in the regions adjacent to the opposite sides 29 and 30 of the gear blank 10 is sufficient to cause those regions of the shaft blank 13 to become relatively plastic or molten in a relatively short period of time.

Since a cooling medium is circulating within the electrical conductors 18, 19, 33 and 34 near the bearing surfaces 22 thereof, as previously described, the shaft blank 13 is cooled in the portions thereof remote from the concentric portions disposed within the gear blank 10 and remains in the solid state. It should be understood that separate water cooling jackets common in the art may be placed about the exposed ends of the shaft blank 13 for the purpose of cooling instead of circulating coolant through the electrical conductors 18, 19, 33 and 34 as heretofore described.

When the regions of the shaft blank 13 adjacent the opposite sides 29 and 30 of the gear blank 10 have become relatively plastic, the electrical circuit for the electric conductors 18, 19, 33 and 34 is maintained and ram or impacting members 37 and 38 (suitably operated such as by pneumatic or hydraulic means for example) carried by the apparatus 15 and mounted coaxially and spaced from the shaft blank 13, engage the ends 25 and 26 of the shaft blank 13 and compress the shaft blank 13 axially to effect radial expansion of the relatively plastic regions of the shaft blank 13 to expand radially and fill the clearance space between the shaft blank 13 and the bore 12 of the gear blank 10 and fuse with the gear blank 10.

After the gear blank 10 has been fused to the shaft blank 13, the electrical current supplied to the electrical conductors 18, 19, 33 and 34 is broken. It is believed that during the axial compression of the shaft blank 13 by the rams 37 and 38 the radially expanding relatively plastic regions of the shaft blank 13 make electrical contact with the gear blank 10 causing the electrical current passing through the shaft blank 13 to be shunted through the gear blank 10. The shunting of the electrical current through the gear blank 10 is believed to cause heating of the gear blank 10 and to assist in the fusion of the gear blank 10 to the relatively plastic regions of the shaft blank 13. The electrical current is broken at an appropriate time interval after the axial compression of the shaft blank 13 by suitable time switching means to provide for suitable fusion of the shaft blank 13 to the gear blank 10.

After the rams 37 and 38 have been moved axially away from the ends 25 and 26 of the shaft blank 13 and the assembly is removed from the holding apparatus 15, the gear blank and shaft blank are rendered substantially integral with each other so that there is no relative movement therebetween and the assembly thereof is suitable for use in high pressure gear-type pumps, after suitable finishing operations thereof. Such gear and shaft assemblies exhibit all of the properties of a unitary structure found by conventional means.

Very little or no metal from the heretofore described relatively plastic regions of the shaft blank 13, when expanded radially by the compression of the rams 37 and 38, is forced beyond the opposite sides 29 and 30 of the gear blank 10, the entire radial expansion thereof filling the clearance space between the shaft blank 13 and the gear blank 10 and uniting them together. Figure 3 illustrates the impacting or compressing operation of the rams 37 and 38 upon the gear and shaft assembly above described for Figure 1. It should be noted that the fusing of the shaft blank 13 to the gear blank 10 does not extend throughout the entire axial bore 12 of the gear blank 10, but only from the opposite sides 29 and 30 of the gear blank 10 inwardly for a short distance within the bore 12. It is believed that the reason why the fusing of the shaft blank 13 to the gear blank 10 does not extend throughout the entire axial bore 12 of the gear blank 10 is because the gear blank 10 acts as a chill block absorbing the heat generated and radiated in the shaft blank 13 at the portion thereof located between the adjacent sides 29 and 30 of the gear blank 10 during the electrical heating thereof. This limits the regions of the shaft blank 13 which can become relatively plastic to those regions adjacent the opposite sides 29 and 30 of the gear blank 10.

It is believed that the axial compression of the shaft blank 13 by the rams 37 and 38 not only causes fusion of the relatively plastic regions of the shaft blank 13 to the gear blank 10, but also places the inner periphery of the gear blank 10 under peripheral tension, thereby effectively pre-stressing the inner portion of the gear blank in tension, as the relatively plastic regions of the shaft blank 13 are expanded radially within the bore 12 of the gear blank 10. However, during subsequent heat treating operations of the gear and shaft assembly, much of the pre-stressing of the inner periphery of the gear blank is probably lost.

In the apparatus 15 heretofore described it was illustrated that a ram member engaged both terminal ends 25 and 26 of the shaft blank 13 for the axial compression thereof. It should be understood that this described arrangement was for purposes of illustration only whereas only one end 25 or 26 could be subject to a compression stroke of an impacting member with the other end of the shaft blank 13 being in contact with a fixed abuting plate. Further, the uniting operation of the gear and shaft assembly is illustrated as occurring in the horizontal position whereas same could be accomplished in accordance with this invention while being held in the vertical position.

I have described the heating of the shaft blank 13 as occurring through electrical "resistance" heating. However, any other type of heating process may be used either electrical or otherwise so long as the portions of the shaft blank 13 adjacent to the opposite sides 29 and 30 of the gear blank 10 will become relatively plastic for the fusing thereof to the gear blank 10 during the axial compression of the shaft blank.

In another embodiment of this invention, as illustrated in Figure 4, the gear blank 10 is provided with an annular peripheral groove 39 within the center of the bore 12. The positioning of the gear blank and shaft blank assembly within the apparatus 15 occurs in substantially the same manner as heretofore described for the example of assembling as illustrated in Figure 1. The shaft blank 13 is also heated until the regions of the shaft blank 13 adjacent the opposite sides 29 and 30 of the gear blank 10 are in a relatively plastic state as previously described. However, during the impacting or compressing operation of the ram members 37 and 38 upon the gear and shaft assembly as illustrated in Figure 5, the relatively plastic regions of the shaft blank 13 are caused to expand radially to not only fuse to the gear blank 10, but also to expand radially into and tend to fill the annular groove 39 of the gear blank 10. Although fusion of the shaft blank 13 to the gear blank 10 does not occur within the annular groove 39, an interference fit is nevertheless provided, placing the gear blank 10 under peripheral tension to further rigidly unite the gear blank 10 to the shaft blank 13.

The annular peripheral groove 39 within the center of the bore 12 of the gear blank 10 is also believed to be utilized to control the heretofore described shunting of the electrical current from the shaft blank 13 through the gear blank 10. Although the annular groove 39 is shown having a semi-circular cross section, the groove 39 may have any cross sectional configuration by properly forming the groove 39 within the bore 12 of the gear blank 10 which provides an additional clearance space between the gear blank 10 and shaft blank 13. The points of contact adjacent the sides 29 and 30 of the gear blank 10 by the radially expanded relatively plastic regions of the shaft blank 13 can be predetermined by the location of the groove 39 thereby predetermining where the fusion of the gear blank 10 to the shaft blank 13 takes place. It should be understood that the annular groove 39 need not be formed only in the bore 12 of the gear blank 10, but may be formed in the outer periphery of the shaft blank 13 or in both the gear blank bore 12 and the shaft blank 13. The purpose being to provide a clearance space between the telescoped portion of the shaft blank 13 and the gear blank 10 whereby the radially expanded relatively plastic regions of the shaft blank 13 can only make contact with the inner periphery of the bore 12 of the gear blank 10 on either side of the clearance space provided by the annular groove 39 adjacent the opposite sides 29 and 30 of the gear blank 10.

The above brief description setting forth the fabrication steps of my invention to produce unitary gear and shaft assemblies from two separate pieces is by way of example only, whereas the various steps where appropriate could be interchanged to facilitate production procedures without changing the scope of my invention which may be summarized as follows: Cutting a gear blank 10 from the appropriately sized bar stock 11; forming a bore 12 in the gear blank 10; cutting a shaft blank 13 from the appropriately sized bar stock 14; inserting the shaft blank 13 within the bore 12 of the gear blank 10, so that the ends 25 and 26 of the shaft blank 13 project beyond the opposite sides 29 and 30 of the gear blank 10; placing electrical conductors 18, 19, 33 and 34 around the shaft blank 13, in contact therewith, and spaced from the opposite sides 29 and 30 of the gear blank 10; placing coolant circulating means around the shaft blank 13; passing an electrical current through the electrical conductors 18, 19, 33 and 34 to heat the shaft blank 13 until the shaft blank 13 becomes relatively plastic in the regions adjacent to the opposite sides 29 and 30 of the gear blank 10 and concentric therewith; and compressing axially the shaft blank 13 by means of rams or press members 37 and 38 to cause the relatively plastic regions of the shaft blank 13 to expand radially and fuse to the gear blank 10.

It is to be understood that although the gear blank 10 has been described as being formed with a central bore 12, it is not the intent to limit the invention to this particular arrangement. The bore 12 could be formed eccentrically through the gear blank 10 and the shaft blank 13 inserted therein and fused thereto in the manner previously described. Further, the bore 12 in the gear blank 10 need not be circular in cross section but may have any cross sectional configuration and the shaft blank 13 may also have any cross sectional configuration. The cross sectional configuration of the shaft blank 13 or inserted member does not necessarily need to complement the cross sectional configuration of the bore in the outer member to which it is fused by the heretofore described method so long as the axial compression of the inserted member is sufficient to expand relatively plastic portions of the inserted member so as to make contact with portions of the bore in the outer member and fuse therewith. Of course, the preferred form of this invention is to have the inserted member complement the cross sectional configuration of the bore in the outer member so that fusion thereto takes place throughout the entire cross section of the inserted member but is not limited to this form.

After the gear blank 10 and the shaft blank 13 have been united as above described, further finishing, heat treating, and machining operations may be accomplished, such as providing gear teeth 40 (see Figure 6) on the outer peripheral surface of the gear blank 10 as well as on the shaft blank 13 if desired.

My invention has solved the problem of fabricating a gear and shaft assembly having a unitary quality from a two-piece construction at a considerable reduction in cost and with relatively no waste metal, the entire heating and impacting operation of the uniting means taking less than ten seconds in practice.

I have further provided an improved gear and shaft assembly where a shaft portion projects beyond the opposite sides of a gear portion telescopically mounted thereon, the shaft portion having been united to the gear portion in such a manner that the gear and shaft assembly has substantially the qualities of a unitary structure.

While I have described my invention in connection with certain specific embodiments thereof, it is to be understood that these are by way of example rather than limitation, and it is intended that the invention be defined by the appended claims which should be given a scope as broad as consistent with the prior art.

I claim:

1. The method of uniting two metal blanks to be telescopically disposed with respect to each other and comprising the steps of: forming a bore in the first blank of said blanks; inserting the second blank of said blanks in said bore; heating said second blank in the region thereof disposed between opposite terminal ends of said first blank until said second blank becomes relatively plastic in said region; and compressing said second blank axially to effect radial expansion of said relatively plastic region of said second blank and thereby cause fusion thereof with said first blank whereby said radially expanded regions are substantially confined within said bore of said first blank.

2. The method of uniting two metal blanks to be telescopically disposed with respect to each other and comprising the steps of: forming a bore in the first blank of said blanks; forming a groove in said bore; inserting the second blank of said blanks in said bore whereby said groove provides a clearance space between said blanks; heating said second blank in the region thereof disposed between opposite terminal ends of said first blank until said second blank becomes relatively plastic in said region; and compressing said second blank axially to effect radial expansion of said relatively plastic region of said second blank and thereby cause fusion thereof with said first blank and said radially expanded regions are substantially confined within said bore of said first blank.

3. The method of uniting two metal blanks to be telescopically disposed with respect to each other and comprising the steps of: forming a bore in the first blank of said blanks; inserting the second blank of said blanks through said bore, so that said second blank projects beyond opposite terminal ends of said first blank; heating said second blank in the region thereof within said opposite terminal ends of said first blank until said second blank becomes relatively plastic in said region; and compressing said second blank axially to effect radial expansion of said relatively plastic region of said second blank and thereby cause fusion thereof with said first blank whereby said radially expanded regions are substantially confined within said bore of said first blank.

4. The method of uniting two metal blanks to be telescopically disposed with respect to each other and comprising the steps of: forming a bore in the first blank of said blanks; inserting the second blank of said blanks through said bore, so that said second blank projects beyond opposite terminal ends of said first blank; placing electrical conductors around said second blank, in contact therewith and spaced from but adjacent to said opposite terminal ends of said first blank; passing an electrical current through said conductors to thereby heat said second blank in the region disposed between said opposite terminal ends of said first blank until said second blank becomes relatively plastic in said region; and compressing said second blank axially to effect radial expansion of said relatively plastic region of said second blank and thereby cause fusion thereof with said first blank whereby said radially expanded regions are substantially confined within said bore of said first blank.

5. The method of uniting two metal blanks to be telescopically disposed with respect to each other and comprising the steps of: forming a bore in the first blank of said blanks; inserting the second blank of said blanks through said bore, so that said second blank projects beyond opposite terminal ends of said first blank; placing electrical conductors around said second blank, in contact therewith and spaced from but adjacent to said opposite terminal ends of said first blank; placing coolant circulating means around said second blank; passing an electrical current through said conductors to thereby heat said second blank in the region within said opposite terminal ends of said first blank until said second blank becomes relatively plastic in said region of said second blank; and compressing said second blank axially to effect radial expansion of said relatively plastic region of said second blank and thereby cause fusion thereof with said first blank whereby said radially expanded regions are substantially confined within said bore of said first blank.

6. The method of uniting two metal blanks to be telescopically disposed with respect to each other and comprising the steps of: forming a bore in the first blank of said blanks; inserting the second blank of said blanks through said bore, so that said second blank projects beyond opposite terminal ends of said first blank; heating said second blank by electrical resistance heating at points thereof adjacent to said terminal ends of said first blank until said second blank becomes relatively plastic in the region disposed between said terminal ends of the said first blank, said relatively plastic region of said second blank being concentrically disposed within said first blank; and compressing said second blank axially to effect radial expansion of said relatively plastic region of said second blank and thereby cause fusion thereof with said first blank whereby said radially expanded regions are substantially confined within said bore of said first blank.

7. The method of making a gear and shaft blank assembly comprising the steps of: forming a bore in said gear blank; inserting said shaft blank in said bore; heating said shaft blank in the region disposed within opposite sides of said gear blank until said region becomes relatively plastic; and compressing said shaft blank axially to effect radial expansion of said relatively plastic region of said shaft blank and thereby cause fusion thereof with said gear blank in said region whereby said radially expanded regions of said shaft blank are substantially confined within said bore of said gear blank.

8. The method of making a gear and shaft blank assembly where said gear blank and said shaft blank are to be united and comprising the steps of: forming a bore in said gear blank; inserting said shaft blank through said bore so that said shaft blank projects beyond opposite sides of said gear blank; heating said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank whereby said radially expanded regions of said shaft blank are substantially confined within said bore of said gear blank.

9. The method of making a gear and shaft blank assembly where said gear blank and said shaft blank are to be united and comprising the steps of: cutting a gear blank from bar stock; forming a bore in said gear blank; cutting a shaft blank from bar stock; inserting said shaft blank through said bore of said gear blank, so that said shaft blank projects beyond the opposite side of said gear blank; heating said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank in said region whereby said radially expanded regions of said shaft blank are substantially confined within said bore of said gear blank.

10. The method of making a gear and shaft blank assembly where said gear blank and said shaft blank are to be united and comprising the steps of: forming a bore in said gear blank; inserting said shaft blank through said bore, so that said shaft blank projects beyond opposite sides of said gear blank; placing electrical conductors around said shaft blank, in contact therewith and spaced from but adjacent to said opposite sides of said gear blank; passing an electrical current through said conductors to thereby heat said shaft blank in the region adjacent said opposite sides of said gear blank until said region becomes relatively plastic; and compressing said shaft blank axially to effect radial expansion of said relatively plastic region of said shaft blank and thereby cause fusion thereof with said gear blank whereby said radially expanded regions of said shaft blank are substantially confined within said bore of said gear blank.

11. The method of making a gear and shaft blank assembly where said gear blank and said shaft blank are to be united and comprising the steps of: forming a bore in said gear blank; inserting said shaft blank through said bore, so that said shaft blank projects beyond opposite sides of said gear blank; placing electrical conductors around said shaft blank, in contact therewith and spaced from but adjacent to said opposite sides of said gear blank; placing coolant circulating means around said shaft blank; passing an electrical current through said conductors to thereby heat said shaft blank in the region disposed between said opposite sides of said gear blank until said region becomes relatively plastic; and compressing said shaft blank axially to effect radial expansion of siad relatively plastic region of said shaft blank and thereby cause fusion thereof with said gear blank in said region whereby said radially expanded regions of said shaft blank are substantially confined within said bore of said gear blank.

12. The method of making a gear and shaft blank assembly where said gear blank and said shaft blank are to be united and comprising the steps of: cutting a gear blank from bar stock; forming a bore in said gear blank; forming an annular groove in said bores; cutting a shaft blank from bar stock; inserting said shaft blank through said bore of said gear blank, so that said shaft blank projects beyond the opposite side of said gear blank and said annular groove provides a clearance space between said blanks; heating said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank in said region.

13. The method of making a gear and shaft blank assembly where said gear blank and said shaft blank are to be united comprising the steps of: cutting a gear blank from stock; cutting a shaft blank from stock; forming a bore in said gear blank; inserting said shaft blank through said bore, so that said shaft blank projects beyond the opposite sides of said gear blank; positioning said gear blank to the desired uniting position relative to said shaft blank; heating said shaft blank in the region disposed between said opposite sides of said gear blank until said region is relatively plastic; and compressing said shaft blank axially to effect radial expansion of said relatively plastic region of said shaft blank and thereby cause fusion thereof with said gear blank whereby said radially expanded regions of said shaft blank are substantially confined within said bore of said gear blank.

14. The method of making a gear and shaft blank assembly where said gear blank and said shaft blank are to be united and comprising the steps of: cutting a gear blank from bar stock; forming a bore in said gear blank; cutting a shaft blank from bar stock; inserting said shaft blank through said bore of said gear blank, so that said shaft blank projects beyond opposite sides of said gear blank; placing electrical conductors around said shaft blank and in contact therewith, said conductors being spaced from and on opposite sides of said gear blank and adjacent thereto; passing an electrical current through said conductors to thereby heat said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank in said region whereby said radially expanded regions of said shaft blank are substantially confined within said bore of said gear blank.

15. The method of making a gear and shaft blank assembly where said gear blank and said shaft blank are to be united and comprising the steps of: cutting a gear blank from bar stock; forming a bore in said gear blank; cutting a shaft blank from bar stock; inserting said shaft blank through said bore of said gear blank, so that said shaft blank projects beyond opposite sides of said gear blank; placing electrical conductors around said shaft blank and in contact therewith, said conductors being spaced from but adjacent to and on opposite sides of said gear blank; placing coolant circulating means around said shaft blank; passing an electrical current through said conductors to thereby heat said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank whereby said radially expanded regions of said shaft blank are substantially confined within said bore of said gear blank.

16. The method of making a gear and shaft blank assembly where said gear blank and said shaft blank are to be united and comprising the steps of: forming a bore in said gear blank; forming an annular groove in said bore; inserting said shaft blank in said bore whereby said annular groove provides a clearance space between said blanks; heating said shaft blank in the region disposed between said opposite sides of said gear blank until said region becomes relatively plastic; and compressing said shaft blank axially to effect radial expansion of said relatively plastic region of said shaft blank and thereby cause fusion thereof with said gear blank.

References Cited in the file of this patent

UNITED STATES PATENTS

| | | |
|---|---|---|
| 418,198 | Lemp et al. | Dec. 31, 1889 |
| 1,294,679 | Lackman | Feb. 18, 1919 |
| 1,322,848 | Von Henke | Nov. 25, 1919 |
| 1,361,214 | Wild | Dec. 7, 1920 |
| 1,881,934 | Powis | Oct. 11, 1932 |
| 2,221,415 | Short | Nov. 12, 1940 |

FOREIGN PATENTS

| | | |
|---|---|---|
| 150,373 | Austria | Aug. 10, 1937 |